(12) United States Patent
Pillitteri et al.

(10) Patent No.: US 11,544,337 B2
(45) Date of Patent: Jan. 3, 2023

(54) SYSTEM TO MATCH SPECIAL NEEDS SERVICE PROVIDERS WITH RECIPIENTS

(71) Applicants: Joseph Anthony Pillitteri, Colorado Springs, CO (US); Ginger Diane Pillitteri, Colorado Springs, CO (US)

(72) Inventors: Joseph Anthony Pillitteri, Colorado Springs, CO (US); Ginger Diane Pillitteri, Colorado Springs, CO (US)

( * ) Notice: Subject to any disclaimer, the term of this patent is extended or adjusted under 35 U.S.C. 154(b) by 0 days.

(21) Appl. No.: 17/163,075

(22) Filed: Jan. 29, 2021

(65) Prior Publication Data

US 2021/0240788 A1 Aug. 5, 2021

Related U.S. Application Data

(60) Provisional application No. 62/968,868, filed on Jan. 31, 2020.

(51) Int. Cl.
| | | |
|---|---|---|
| G06F 16/9535 | (2019.01) | |
| G06Q 50/22 | (2018.01) | |
| G06F 16/9538 | (2019.01) | |
| G06Q 30/00 | (2012.01) | |

(52) U.S. Cl.
CPC ...... G06F 16/9535 (2019.01); G06F 16/9538 (2019.01); G06Q 30/018 (2013.01); G06Q 50/22 (2013.01)

(58) Field of Classification Search
CPC ............ G06F 16/9535; G06F 16/9538; G06Q 30/018; G06Q 50/22
See application file for complete search history.

(56) References Cited

U.S. PATENT DOCUMENTS 7,739,123 B1 * 6/2010 Rappaport ............. G16H 50/20
705/2
2020/0387504 A1 * 12/2020 Holliday ............... G06F 3/0482

* cited by examiner

*Primary Examiner* — Kris E Mackes
(74) *Attorney, Agent, or Firm* — Cygnet IP Law, P.A.; Stephen W. Aycock, II (57) ABSTRACT

Users often have a need for service providers that are experienced and able to provide a service to those with one or more special needs conditions or diagnoses. Some implementations can include a system to match a user with a service provider over a communications network. The system comprises obtaining user registration data, service provider registration data, and receiving a query, wherein the combination of the user query and the user registration data has one or more of a diagnostic code, an education plan code, or grade level information. Further, the diagnosis or condition used in the matching of the user query with one or more service providers, is independent of and unrelated to the service provided by the service provider. The system uses a combination of query data, user registration data, including user diagnosis or condition, and the service provider data, to provide matching results of one or more service providers.

18 Claims, 4 Drawing Sheets

SYSTEM TO MATCH SPECIAL NEEDS SERVICE PROVIDERS WITH RECIPIENTS

RELATED APPLICATIONS

This application claims the benefit of U.S. Application No. 62/968,868, entitled "Systems, Methods and Computer Readable Media for Special Needs Service Provider Matching", filed on Jan. 31, 2020, which is incorporated herein by reference in its entirety.

FIELD

Some implementations relate to the field of computer databases. More specifically, some implementations relate to a system configured to match a combination of user query data and stored user data with service provider data in a specialized database where a portion of the query data is a diagnosis or condition that is unrelated to the service provided by the service provider.

BACKGROUND

Families, having a child or other family member who has one or more special needs based on a condition or medical diagnosis, often have a need for service providers that are experienced and able to provide a service to those with one or more special needs conditions or diagnoses. It may be difficult or impossible to determine via computerized search whether a service provider has such experience and accepts clients with one or more conditions or diagnoses.

Further, there may not exist a rating or review system for service providers that provide a rating for the service provider on both the core service provided by the service provider and the service provider's ability to work with a person with special needs.

Also, there may exist a need for locating service providers to assist a person with special needs or the family of a person with special needs in a town or location familiar or unfamiliar to the family of the person with special needs. Families of the person with special needs may be unable to locate a service provider that 1) can accommodate the special needs of the family member, and 2) has been reviewed by others and received a favorable rating.

Further, there exists a need for providing educational instructions through certified special needs educators to learners with Individualized Education Programs (IEP) or those who may be at-risk academically. Statistics show that approximately 15% of private schools are set up or adequately set up to teach the special needs community. Usually, this means that a child with special needs is integrated into a general education classroom which does not allow for the proper support and accommodations to be utilized. The byproduct is that the families who would be registering to your school simply choose another system to support their needs. For public schools, U.S. Department of Education indicated in a report published in July of 2020 that just "21 states satisfied the "meets requirements" threshold for the 2018-2019 school year in annual evaluations of their obligations under the Individuals with Disabilities Education Act for students ages 3 to 21. Meanwhile, 27 states and Washington, D.C. were classified as "needs assistance," many of which have qualified for the designation for two years in a row or more. Two states New York and Vermont— received the lower designation of "needs intervention"." (disability scoop, Jul. 6, 2020). This ultimately affects the growth of the school and the educational support for the learner. This is a "lose-lose" situation for the family and the school.

Some implementations were conceived in light of the above-mentioned problems and limitations, among other things.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Some implementations can include a method comprising obtaining user registration data, obtaining service provider registration data, and receiving a query. The method can also include matching a combination of query data and user registration data with the service provider data, and outputting a result of the matching, wherein the result includes one or more records that match within a given threshold.

The method can further include filtering the result of the matching based on one or more third-party data items and outputting the filtered results. In some implementations, the user registration data includes one or more of a diagnosis or a condition corresponding to a special need of a person. In some implementations, the combination includes the diagnosis or the condition. In some implementations, the diagnosis or the condition is independent of a service provided by the service provider, and wherein the matching results include service provider data indicating that the matching service providers provide the service from the query to people having the diagnosis or the condition. In some implementations, the third-party data includes one of a rating above a rating threshold or a verification, wherein the rating threshold is included as part of the query, and the verification indicates that the service provider was verified by a third-party.

DETAILED DESCRIPTION

The systems and methods provided herein may overcome one or more deficiencies of some conventional manual special needs service provider search and identification techniques.

Some implementations can include a method or system to search for services for a person with special needs using a combination of one or more diagnoses, age, location (and possibly other demographic data), where the service is independent of a diagnosis (e.g., finding a barber for a person with autism). Some implementations can include searching using a current location or a selected location (e.g., for vacation, relocation research, etc.). Some implementations can include presenting a semi-personalized view of a web site (or section of a website, e.g., a "Selected for You" type section) for each visitor, where the view is based on location, one or more diagnoses, age, history of use, etc. Some implementations can include alerts to members about new reviews related to diagnoses that the user has indicated in a profile, e.g., alerts that are tailored to the specific combination of data such as a diagnosis/age/location combination.

Some implementations can include matching tutors or educators from an online tutoring service or special needs education service for a person with special needs, using a combination of one or more diagnoses, age, etc. Some implementations can include matching a public or private school with a student that has a specific diagnosis and education plan that calls for state credentialed special needs educators having both grade level and/or subject level expertise along with special needs certification for the particular diagnosis or Individualized Education Program (e.g., pull out service, special resource room, individualized therapy, etc.) for that student. Some implementations can include matching with a quality tutor, therapists, and other service providers for students who are at-risk academically but who do not qualify for IEP. Some implementations can include a public or private school requesting special needs education service for a person with special needs for a specific date, time, and location, and the system using a combination of one or more special needs diagnoses to find a matching service provider, such as a special needs tutoring service, and scheduling a lesson with the service provider.

Some implementations can include further processing in response to a user expressing positive reinforcement on a match of the one or more matches provided as a result of the matching service to the user, enabling communication between the user and the service provider to determine the right fit by providing opportunities of further assessment.

Some implementations can include verification of service providers, e.g., credential review, checking with licensing agencies, etc., so that a verified provider has a special indication on the site or app.

As used herein diagnosis or condition refers to anything that creates a special need for an individual or caregiver. For example, a diagnosis or condition can include but is not limited to mental, cognitive, emotional, physical, psychological, medical, neurological, or developmental disabilities or limitations. Some examples of diagnoses and conditions include: autism, deaf-blindness, hearing impairment, visual impairment, deafness, developmental delay, emotional disturbance, intellectual disability, multiple disabilities, orthopedic impairment, other health impairment, specific learning disability, speech or language impairment, traumatic brain injury, visual impairment (including blindness), auditory processing disorder, academic problems, disorders of attention, poor motor abilities, psychological process deficits, and information-processing problems, lack of cognitive strategies needed for efficient learning, oral language difficulties, reading difficulties, written language problems, mathematical disorders, social skill deficits and/or deficiencies, sensory sensitivities, dyslexia or other processing disorders, ADD, ADHD, and/or gifted/talented.

In general, a diagnosis or condition can represent any person with a disability or any person evaluated in accordance with any state or federal law as having an intellectual disability, a hearing impairment (including deafness), a speech or language impairment, a visual impairment (including blindness), a serious emotional disturbance (e.g., "emotional disturbance"), an orthopedic impairment, autism, traumatic brain injury, any other health impairment, a specific learning disability, deaf-blindness, or multiple disabilities, and who, by reason thereof, needs special education and related services.

Further, a person with special needs can include anyone who fits any definition found under IDEA (individuals with disabilities education act, Federal) or any government (e.g., federal, state, or local) definition or medical or educational definition of an individual with special needs.

Services provided that can be matched with an implementation of the system described herein can include, but are not limited to any service that may require special training, experience, skills, knowledge, abilities, or augmentations to deal with, service, handle, or accommodate a person with any type of disability listed above.

Services can include:
1. Professional services
   a. Optometrist
   b. Audiologist
   c. Dentists
   d. Physician—generalists, specialists, et
   e. Psychologist
   f. Lawyers
      i. Trusts
      ii. Accommodations, etc.
   g. ABA
   h. Nutritionist/dietician
   i. Therapist
      i. Speech
      ii. OT
      iii. APE
      iv. PT
      v. Vision therapy
   j. Financial advisors
      i. Financial planners
         1. Trusts
         2. Planning
2. Lifestyle services
   a. Travel
   h. Vacation
   c. Diet/nutrition
   d. Haircuts and other aesthetic services
   e. Activities
3. Transition
   a. Schools
      i. Pre-school
      ii. Elementary School
      iii. Middle School
      iv. High School
      v. College
   b. Services
   c. Employment
   d. Residential
4. Education
   a. Schools
      i. Private
      ii. Public
      iii. College
   b. Tutors
5. Financial
   a. Trusts
   b. Financial planners Some implementations can include a website, a mobile application, and/or a desktop application. Some implementations can be configured for use with voice activated devices (Alexa, Siri, Google Home, or other smart speaker, etc.), a virtual assistant or any other voice queries and a natural-language user interface to answer questions, make recommendations, and perform actions by delegating requests to a set of Internet services in order to use the information to make recommendations for a user. Artificial intelligence (AI) compatible to learn the functionality, ability, limitations, etc. of a user and make recommendations on maps or other means for services, parks, tools, toys, nutrition, diet, or other recommendations suitable to the person with a special need. For example, if the system has permission to monitor conversations, the system could monitor parents talking about a diagnosis or condition of themselves of a family member. The system can use what info was gathered and use the rating system to automatically recommend a professional or a course of action, a forum, blog, or a discussion group on the website, etc. that has been matched according to the technique described herein using a machine learning model.

In some implementations, resources can be organized into categories (e.g., in a menu structure or other navigation system within an app, website or other software program). The categories can include, but are not limited to, professional, therapist/therapies, lifestyle, support groups, transition, education, camps, programs and activities, evaluation and diagnosis, safety, and state and local organizations.

Within the professional category, services types can include adoption, audiologist, dentists, advocacy (e.g., legal or financial), medical, nutrition, and/or psychology. Within the therapy/therapies category service types can include applied behavior analysis, early start Denver model, floor time or DIR, local early intervention providers, Medicaid waiver, neurologists, occupational therapy, physical therapy, pivotal response treatment (PRT), relationship development intervention (RDI), speech and language therapy, state developmental disability agency, state early intervention office, TEACCH, verbal behavior, and/or vision therapy.

Within the lifestyle category ice types can include activities, diet/nutrition haircuts, travel, and/or vacation. Within the support groups category, service types can include adults, autism communities, family/parents, grandparents, and/or siblings. Within the transition category service types include employment/post-school, residential, and/or transportation. Within the education category, service types can include schools and/or tutors.

Within the camps, programs, and activities category after-school programs, arts and crafts, camps, community activities, day programs, equine programs, respite care, and/or social skills. Within the evaluation and diagnosis category, autism evaluation, pediatricians/developmental, psychiatrists, psychologists and counselors, and/or specialized. autism centers. Within the safety category, service types can include first responder resources. Within the state and local category, services types can include assistive technologies, local disability organizations, protection and advocacy, special education office, social security office locator, and/or state services and entitlements.

Figure 1:
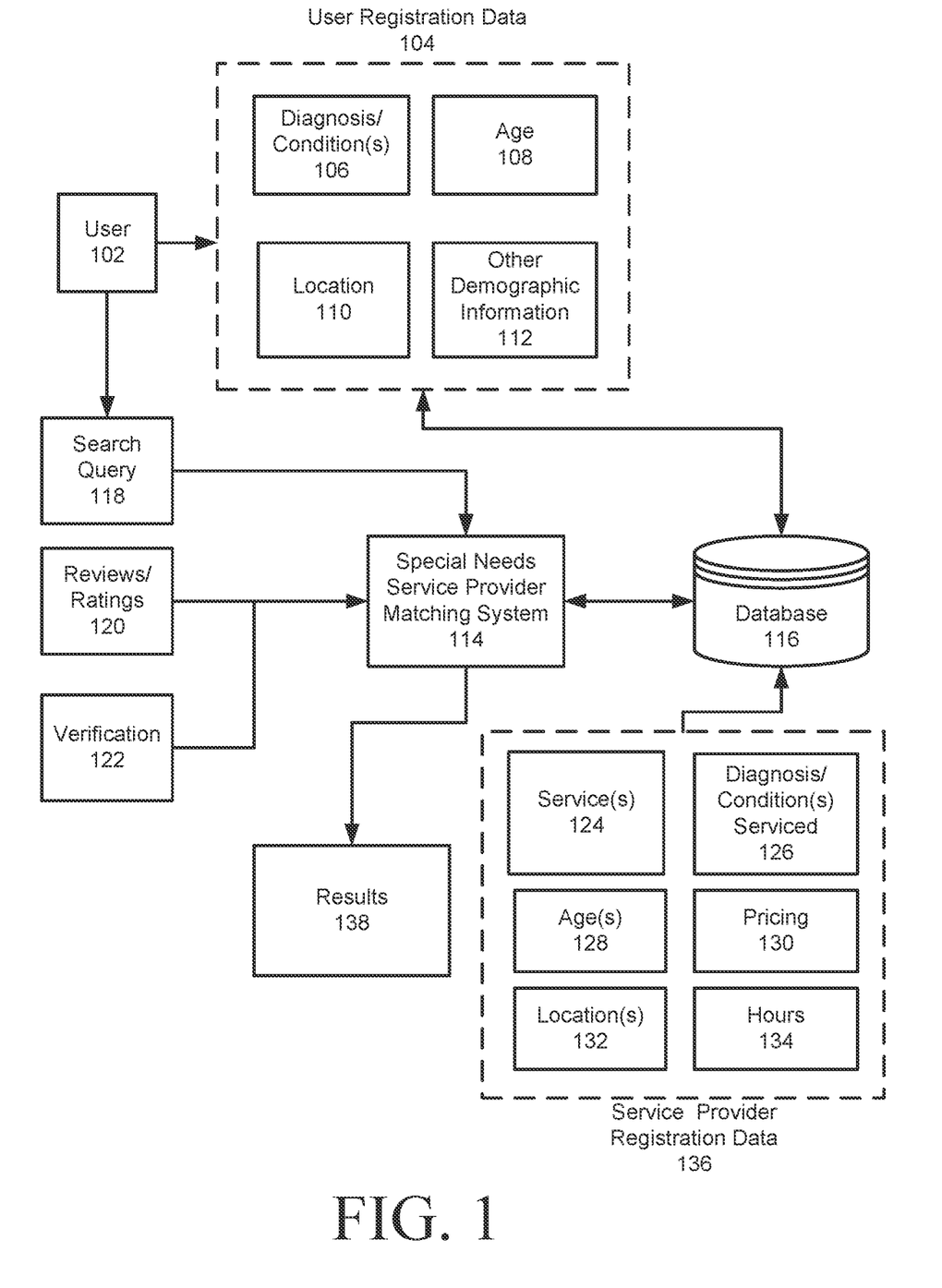
FIG. 1 is a block diagram of an example special need service provider matching system in accordance with some implementations.

FIG. 1 is a block diagram of an example special need service provider matching system in accordance with some implementations. The system can include one or more users 102, where each user provides user registration data 104 that can include (for each person with special needs the user registers) one or more diagnoses or conditions 106, an age 108, a location 110, and/or other information 112 (e.g., gender, other medical conditions, abilities, limitations, etc.). The user registration data 104 can be stored in a data store or database 116 via a special needs service provider matching system 114, which can include a matching module.

The special needs service provider matching system 114 can access the database 116 to store service provider registration data 136, which can include services provided 124, diagnoses or conditions serviced 126, ages 128, pricing 130, location(s) 132, or hours 134.

The special needs service provider matching system 114 also receives a search query 118 from the user 102. The search query can include a service that the user is searching for (e.g., haircut or music lesson). The special needs service provider matching system 114 also receives reviews/ratings 120 of service providers and verifications 122 of service providers.

The special needs service provider matching system 114 matches service providers with user queries based on the method described below to generate results 138.

Figure 2:
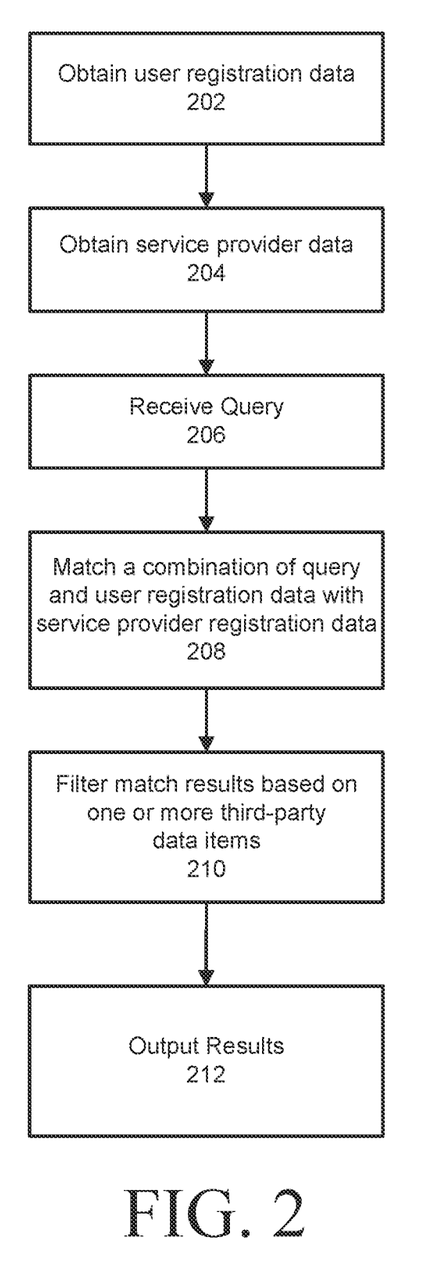
FIG. 2 is a flowchart for special needs service provider matching in accordance with some implementations.

FIG. 2 is a flowchart for special needs service provider matching in accordance with some implementations. Processing begins at 202, where user registration data is received. Processing continues to 204.

At 204, service provider registration data is received. Processing continues to 206.

At 206, a query is received. Processing continues to 208.

At 208, a combination of query and user registration data is matched against service provider registration data (e.g., via the matching module). For example, if a user query is a haircut and the user registration data for one or more people associated with user registration includes a diagnosis of autism, the system will match against a service provider (barber or hairdresser) that has indicated an ability to work with persons having a diagnosis of autism. The match may be exact or may be within a threshold or a nearest match (e.g., a diagnosis may not be exact but may be a service provider that works with people having a diagnosis or condition similar to that of the user registration data). Processing continues to 210.

At 210, results from 208 are optionally filtered based on one or more third-party data items such as rating or verification. For example, a person may want a service provider with a rating above a given threshold and that has been verified. Processing continues to 212.

At 212, the results (e.g., the match results or the filtered match results) are output. The output can include an electronic message transmitted to a mobile device, an email sent automatically from the system to an email account, a synthesized voice call, audio output from a device, a printed output, or an electronic message transmitted to another system, or a display of the output information on a display device.

Figure 3:
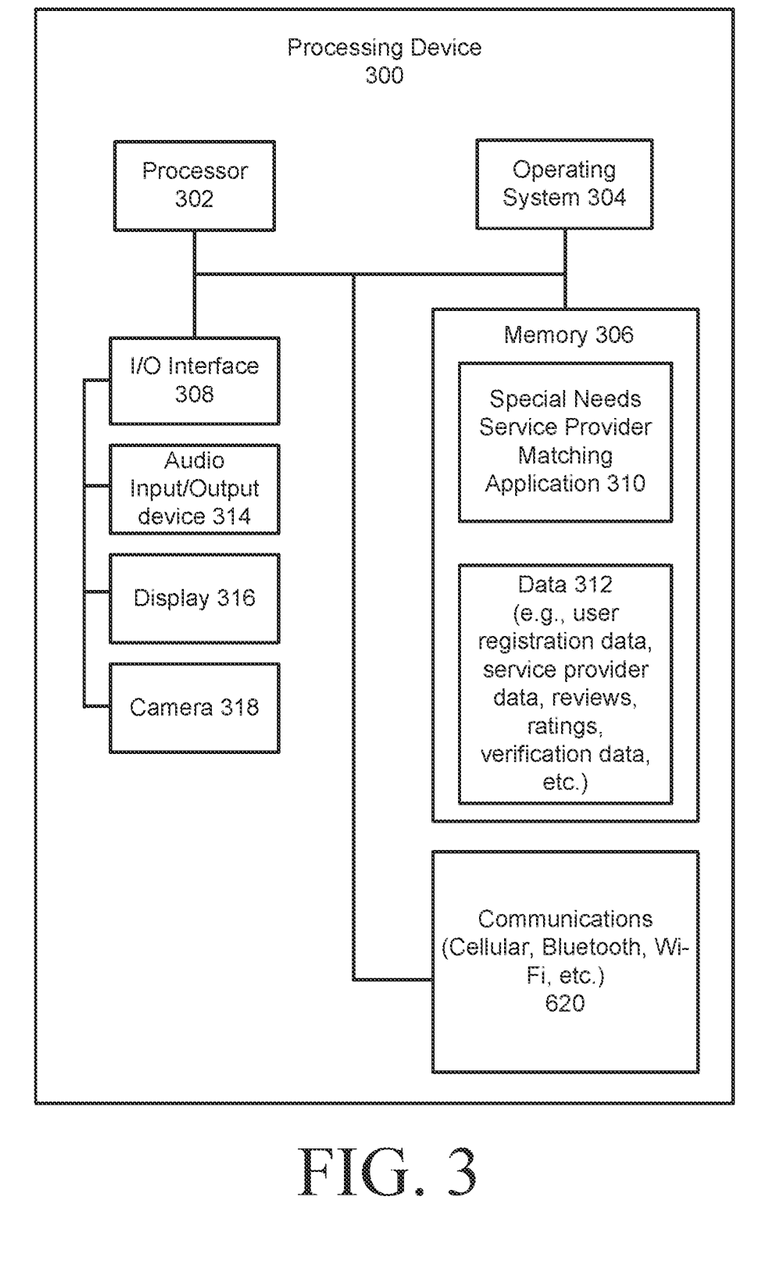
FIG. 3 is a block diagram of an example computing device in accordance with some implementations.

FIG. 3 is a block diagram of an example processing device 300 which may be used to implement one or more features described herein. In one example, device 300 may be used to implement a computer device, e.g., a server device (e.g., 114 of FIG. 1), and perform appropriate method implementations described herein (e.g., one or more of 202-210). Device 300 can be any suitable computer system, server, or other electronic or hardware device. For example, the device 300 can be a mainframe computer, desktop computer, workstation, portable computer, laptop computer, or electronic device (portable device, mobile device, cell phone, smart phone, tablet computer, television, TV set top box, personal digital assistant (PDA), media player, game device, wearable device, etc.). In some implementations, device 300 includes a processor 302, an operating system 304, a memory 306, and input/output (I/O) interface 308.

Processor 302 can be one or more processors and/or processing circuits to execute program code and control basic operations of the device 300. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 306 is typically provided in device 300 for access by the processor 302, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 302 and/or integrated therewith. Memory 306 can store software operating on the server device 300 by the processor 302, including an operating system 304, one or more applications 310, and data 312. In some implementations, applications 310 can include instructions that enable processor 302 to perform the functions described herein, e.g., some or all of the method of FIG. 2.

For example, applications 310 can include a special needs service provider matching application. Other applications or engines 314 can also or alternatively be included in applications 310, e.g., email applications, SMS and other phone communication applications, web browser applications, media display applications, communication applications, web hosting engine or application, social networking engine or application, etc. Any of software in memory 304 can alternatively be stored on any other suitable storage location or computer-readable medium. In addition, memory 304 (and/or other connected storage device(s)) can store images, video, and other instructions and data used in the features described herein. Memory 304 and any other type of storage (magnetic disk, optical disk, magnetic tape, or other tangible media) can be considered "storage" or "storage devices."

I/O interface 308 can provide functions to enable interfacing the server device 300 with other systems and devices. For example, network communication devices, storage devices (e.g., memory and/or database), and input/output devices can communicate via interface 308. In some implementations, the I/O interface 308 can connect to interface devices including input devices (keyboard, pointing device, touchscreen, microphone, camera, scanner, etc.) and/or output devices (display device, speaker devices, printer, motor, etc.). Audio input/output device 314 (e.g., microphone and speaker), display device 316 and camera device 318 are examples of input/output devices that may be used to capture input (microphone and/or camera) and to provide output (display and speaker). Display device 316 can be connected to device 300 via local connections (e.g., display bus) and/or via networked connections and can be any suitable display device, some examples of which are described below.

For ease of illustration, FIG. 3 shows one block for each of processor 302, memory 306, I/O interface 308, and software block 310. These blocks may represent one or more processors or processing circuitries, operating systems, memories, I/O interfaces, applications, and/or software modules. In other implementations, device 300 may not have all of the components shown and/or may have other elements including other types of elements instead of, or in addition to, those shown herein. While 114 is described as performing operations as described in some implementations herein, any suitable component or combination of components of system 114 or similar system, or any suitable processor or processors associated with such a system, may perform the operations described.

Figure 4:
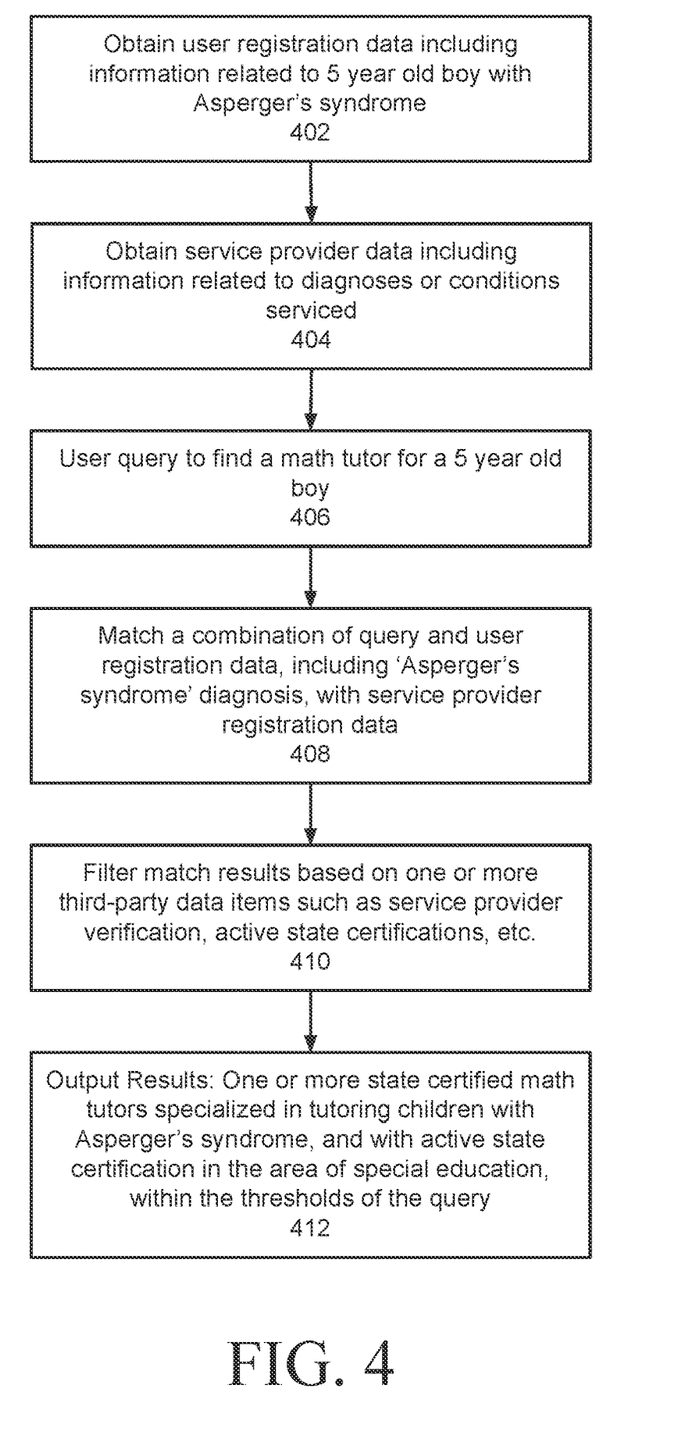
FIG. 4 is an example flowchart for special needs service provider matching in accordance with some implementations.

FIG. 4 is an example flowchart for special needs service provider matching in accordance with some implementations. Processing begins at 402, where user registration data is received, including an 'Asperger's syndrome' diagnosis for a 5 year old boy associated with the user's registration. Processing continues to 404.

At 404, service provider registration data is received, including information related to diagnoses or conditions serviced. Processing continues to 406.

At 406, a query to find a math tutor for the 5 year old boy, associated with the user's registration, is received. Processing continues to 408.

At 408, a combination of query and user registration data, including information related to special needs, diagnoses, conditions, grade level of one or more persons associated with the user registration, or an individualized education plan code, is matched against service provider registration data. In this example, the user registration data for the 5 year old boy includes a diagnosis of Asperger's syndrome. Therefore, the system will match the user query against a service provider (math tutor) that has indicated an ability to work with children having a diagnosis of Asperger's syndrome. The match may be exact or may be within a threshold or a nearest match (e.g., a diagnosis may not be exact but may be a service provider that works with people having a diagnosis or condition similar to that of the user registration data). Processing continues to 410.

At 410, results from 408 are optionally filtered based on one or more third-party data items such as rating or verification. For example, a person may want a service provider with an active state certification in the area of special education and the certification has been verified. Processing continues to 412.

At 412, the results (e.g., the match results or the filtered match results) are output. The output can include an electronic message transmitted to a mobile device, an email sent automatically from the system to an email account, a synthesized voice call, audio output from a device, a printed output, or an electronic message transmitted to another system, or a display of the output information on a display device.

One or more methods described herein (e.g., method 200) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software.

Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

The special needs service provider matching system 114 can include one or more machine learning models such as a neural network. The training of the model can include user-specific training of the neural network(s) based on past user service provider choices, etc. The training approach mentioned above could include associated weights for predictions. In some implementations, the trained model is trained offline and/or online, e.g., if the user selects an service provider that was predicted, that can act as positive reinforcement to the model, while if the user chooses a different service provider that can serve as negative reinforcement. Online training can permit the machine learning model to dynamically adjust predictions of service providers or service provider recommendations. Online training permits the system to adjust the selection process over time.

In some implementations, a single neural network can be trained based on data with weights assigned to training inputs.

The model form or structure may specify connectivity between various nodes and organization of nodes into layers. For example, nodes of a first layer (e.g., input layer) may receive data as input data or application data. Subsequent intermediate layers may receive as input output of nodes of a previous layer per the connectivity specified in the model form or structure. These layers may also be referred to as hidden layers. A final layer (e.g., output layer) produces an output of the machine-learning application. For example, the output may provide one or more special needs service provider recommendations or suggestions.

In some implementations, the trained model may include weighted individual nodes and/or connections. A respective weight may be applied to a connection between each pair of nodes that are connected per the model form, e.g., nodes in successive layers of the neural network. In some implementations, respective weights may be randomly assigned, or initialized to default values. The model may then be trained, e.g., using data, to produce a result, where the training can include adjusting one or more of nodes, node structure, connections, and/or weights.

A model can include a loss function representing the difference between a predicted value and an actual label. The model can be trained to minimize the loss function. Training can include supervised, unsupervised, or semi-supervised learning techniques. In supervised learning, the training data can include a plurality of inputs and a corresponding expected output for each input. Based on a comparison of the output of the model with the expected output (e.g., computing the loss function), values of the weights are automatically adjusted, e.g., in a manner that increases a probability that the model produces the expected output when provided similar input (i.e., reduces the loss function). In unsupervised learning, models learn relationships between elements in a data set and classify raw data without the benefit of labeled training data. Semi-supervised learning can include a combination of supervised and unsupervised techniques, for example, a small amount of labeled training data and a large amount of unlabeled training data can be provided to a model for learning. Once the model is trained, it can be used to predict special needs service providers based on real-world data.

In some implementations, neural networks (as well as other learning algorithms) tend to produce a weighted set of choices. Some implementations can include performing the training step until the weight for the correct answer is a threshold value larger than the next option. By continually improving the data set, and by discarding incorrect decisions, there may be little downside to shipping any particular network. Performance can be analyzed by tracking how well any particular network is performing over time.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

It will be appreciated that the modules, processes, systems, and sections described above can be implemented in hardware, hardware programmed by software, software instructions stored on a non-transitory computer readable medium or a combination of the above. A system as described above, for example, can include a processor configured to execute a sequence of programmed instructions stored on a non-transitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a non transitory computer readable medium).

Furthermore, embodiments of the disclosed method, system, and computer program product (or software instructions stored on a non transitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering, image processing and/or machine vision arts.

Moreover, embodiments of the disclosed method, system, and computer readable media (or computer program product) can be implemented in software executed on a programmed general-purpose computer, a special purpose computer, a microprocessor, a network server or switch, or the like.

It is, therefore, apparent that there is provided, in accordance with the various embodiments disclosed herein, methods, systems and computer readable media for special needs service provider matching.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A system to match a user to a service provider over a communications network, the system comprising:
   at least one computer terminal associated with the user for allowing the user to access the communications network;
   a network server coupled to the communications network, the network server comprising a computer program having:
   a service provider database, wherein the service provider database comprises information related to one or more of a plurality of service providers, services offered, diagnoses or conditions serviced, ages, pricing, locations, or hours of each of the plurality of service providers;
   a user registration database to store user registration data, wherein the user registration data includes one or more of a diagnosis or a condition corresponding to a special need of the user or one or more persons associated with the user registration;
   a processor configured to:
   receive a user query, wherein a combination of the user query and the user registration data in the user registrations database includes one or more of a diagnostic code or an education plan code, and wherein the diagnostic code or the education plan code is used as an input to a matching module, and wherein a portion of the user query is a diagnosis or condition that is independent of and unrelated to a service provided by one of the plurality of service providers;
   automatically determine, via the matching module, an output including one or more matching service providers;
   permit the user to select a matching service provider from among the one or more matching service providers from a graphical user interface; and
   schedule a service session for the user with the selected matching service provider via the graphical user interface.

2. The system of claim 1, wherein the output is based on one or more of a grade level of the user, a subject of interest, the diagnostic code, or the education plan code.

3. The system of claim 1, wherein the output includes service provider data indicating that the one or more matching service providers provide a queried service that is included as part of the user query.

4. The system of claim 3, further comprising filtering the output based on one or more third-party data items, and outputting the filtered output.

5. The system of claim 4, wherein the one or more third-party data items includes one or more of a rating above a rating threshold or a verification status, wherein the rating threshold is included as part of the user query, and the verification status indicates that the matching service provider is verified by a third-party.

6. The system of claim 4, wherein the filtered output includes one or more of an electronic message transmitted to a mobile device, an email sent automatically to an email account, a synthesized voice call, audio output from a device, a printed output, or an electronic message transmitted to another system, or a display on a display device.

7. A non-transitory computer-readable storage medium containing software instructions to operate a system to match a user to a service provider over a communications network, the system comprising:
- at least one computer terminal associated with the user for allowing the user to access the communications network;
- a network server coupled to the communications network, the network server comprising a computer program having:
- a service provider database, wherein the service provider database comprises information related to one or more of a plurality of service providers, services offered, diagnoses or conditions serviced, ages, pricing, locations, or hours of each of the plurality of service providers;
- a user registration database to store user registration data, wherein the user registration data includes one or more of a diagnosis or a condition corresponding to a special need of the user or one or more persons associated with the user registration;
- the software instructions including a first software portion that when executed by one or more processors cause the one or more processors to perform operations including:
- receiving a user query, wherein a combination of the user query and the user registration data in the user registrations database includes one or more of a diagnostic code or an education plan code, and wherein the diagnostic code or the education plan code is used as an input to a matching module, and wherein a portion of the user query is a diagnosis or a condition that is independent of and unrelated to a service provided by one of the plurality of service providers;
- automatically determining, via the matching module, an output including one or more matching service providers;
- the software instructions including a second software portion that when executed by one or more processors cause the one or more processors to perform operations including:
- permitting the user to select a matching service provider from among the one or more matching service providers from a graphical user interface; and
- scheduling a service session for the user with the selected matching service provider via the graphical user interface.

8. The non-transitory computer-readable storage medium of claim 7, wherein the output is based on one or more of a grade level of the user, a subject of interest, the diagnostic code, or the education plan code.

9. The non-transitory computer-readable storage medium of claim 7, wherein the output includes service provider data indicating that the one or more matching service providers provide a queried service that is included as part of the user query.

10. The non-transitory computer-readable storage medium of claim 9, further comprising filtering the output based on one or more third-party data items and outputting the filtered output.

11. The non-transitory computer-readable storage medium of claim 10, wherein the one or more third-party data items includes one or more of a rating above a rating threshold or a verification status, wherein the rating threshold is included as part of the user query, and the verification status indicates that the matching service provider is verified by a third-party.

12. The non-transitory computer-readable storage medium of claim 10, wherein the filtered output includes one or more of an electronic message transmitted to a mobile device, an email sent automatically to an email account, a synthesized voice call, audio output from a device, a printed output, or an electronic message transmitted to another system, or a display on a display device.

13. A computer implemented method to match a user to a service provider over a communication network, the method comprising:
- obtaining user registration data, wherein the user registration data includes one or more of a diagnosis or a condition corresponding to a special need of the user or one or more persons associated with the user registration;
- obtaining service provider registration data, wherein the service provider registration data includes information related to a plurality of services offered, diagnoses or conditions serviced, ages serviced, pricing, locations, or hours of a plurality of service providers;
- receiving a user query, wherein a combination of the user query and the user registration data includes one or more of a diagnostic code or an education plan code, and wherein the diagnostic code or the education plan code is used as an input to a matching module, and wherein a portion of the user query is a diagnosis or condition that is independent of and unrelated to the service provided by the service provider;
- automatically determine, via the matching module, an output including one or more matching service providers;
- matching the combination of the user query and the user registration data with the service provider registration data; and
- outputting a result of the matching, wherein the result includes one or more records that match within a given threshold.

14. The method of claim 13, wherein the output is based on one or more of a grade level of the user, a subject of interest, the diagnostic code, or the education plan code.

15. The method of claim 13, wherein the output includes service provider data indicating that the one or more matching service providers provide a queried service that is included as part of the user query.

16. The method of claim 15, further comprising filtering the result of the matching based on one or more third-party data items and outputting the filtered result of the matching.

17. The method of claim 16, wherein the one or more third-party data items includes one or more of a rating above a rating threshold or a verification status, wherein the rating threshold is included as part of the user query, and the verification status indicates that the matching service provider is verified by a third-party.

18. The method of claim 16, wherein the filtered output includes one or more of an electronic message transmitted to a mobile device, an email sent automatically to an email account, a synthesized voice call, audio output from a device, a printed output, or an electronic message transmitted to another system, or a display on a display device.

* * * * *